(12) United States Patent
Bouzidi

(10) Patent No.: US 6,728,373 B1
(45) Date of Patent: Apr. 27, 2004

(54) DIFFERENTIAL OUTPUT STAGE FOR ELECTRONIC EQUIPMENT PROVIDING A REMOTE POWER FEED TO A TERMINAL

(75) Inventor: Jean-Pierre Bouzidi, Lannion (FR)

(73) Assignee: Alcatel, Paris (FR)

(*) Notice: Subject to any disclaimer, the term of this patent is extended or adjusted under 35 U.S.C. 154(b) by 517 days.

(21) Appl. No.: 09/637,501

(22) Filed: Aug. 11, 2000

(51) Int. Cl.$^7$ ................................................. H04M 1/00
(52) U.S. Cl. ............. 379/413; 379/390.01; 379/395.01; 330/259; 330/260
(58) Field of Search ................... 379/380, 381, 379/388.06, 388.07, 390.01, 93.05, 93.36, 399.01, 413, 413.02, 400, 401, 402, 387.01, 395.01; 330/258, 259, 260, 265

(56) References Cited

U.S. PATENT DOCUMENTS

| | | | |
|---|---|---|---|
| 4,161,693 A | 7/1979 | Carlson | |
| 5,150,071 A | 9/1992 | Bouzidi | |
| 5,345,190 A | 9/1994 | Kaylor | |

FOREIGN PATENT DOCUMENTS

EP  0 449 200 A1  10/1991

Primary Examiner—Rexford Barnie
(74) Attorney, Agent, or Firm—Sughrue Mion, PLLC

(57) ABSTRACT

The stage includes two channels each connecting an input to an output. Each channel includes a first device for adding to the input voltage of the channel concerned a feedback voltage from the other channel to the channel concerned. For remote power feeding a terminal, the stage further includes respective means in each channel for adding a DC voltage to the output voltage of that channel. The feedback voltage is a function only of the AC component of the output voltage of the first device of the channel concerned. Application to telephone exchanges.

3 Claims, 3 Drawing Sheets

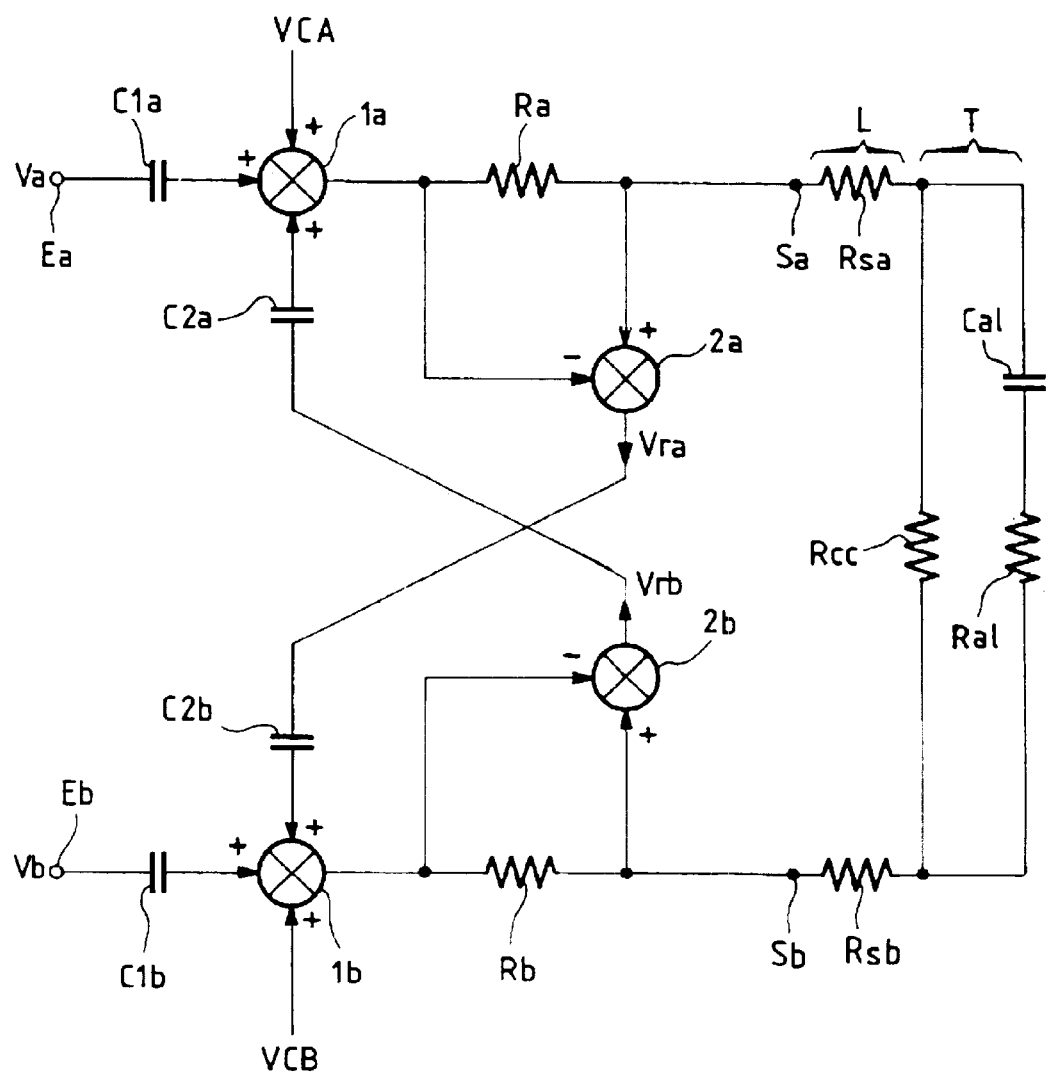
FIG_1

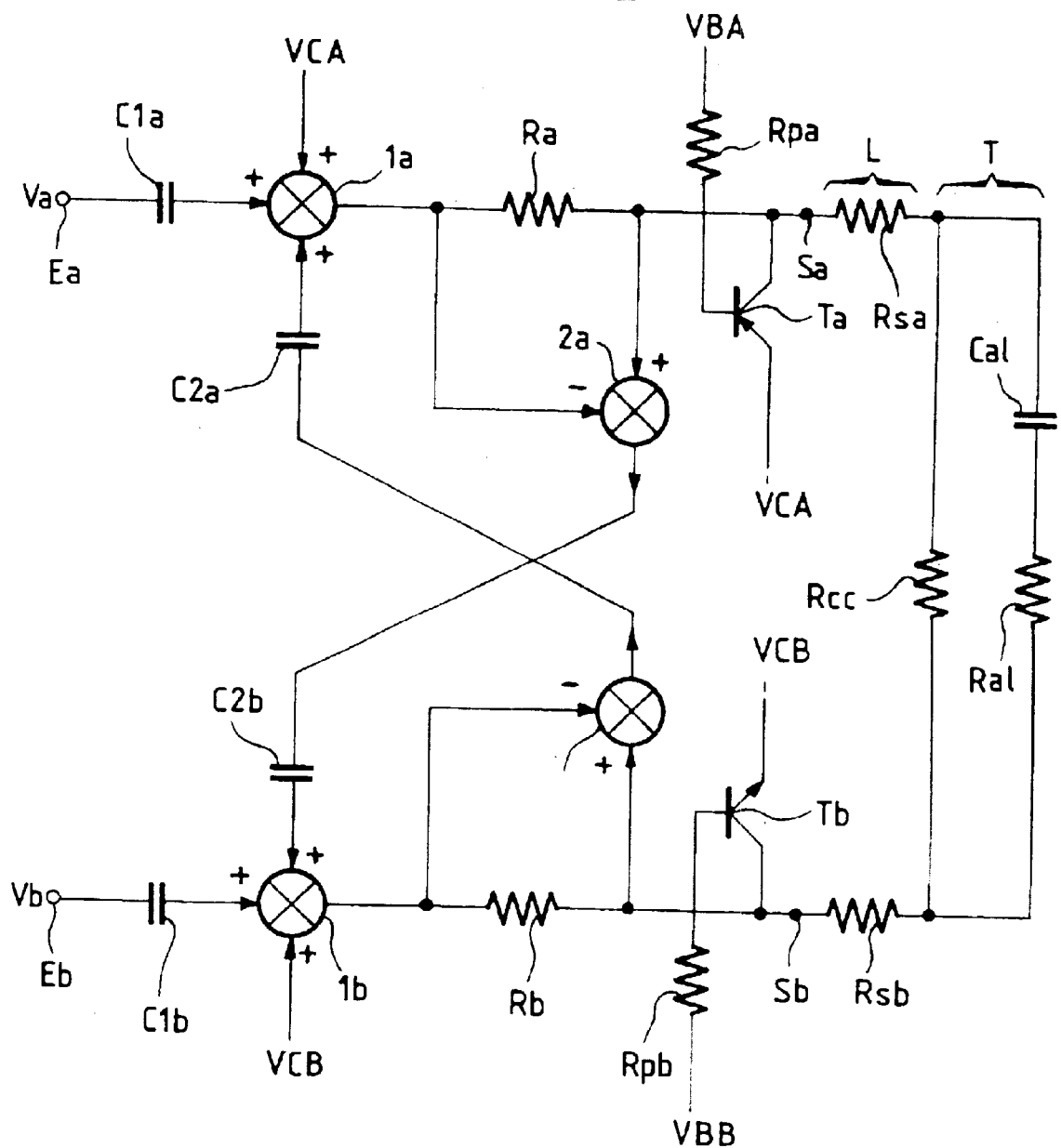
FIG_2

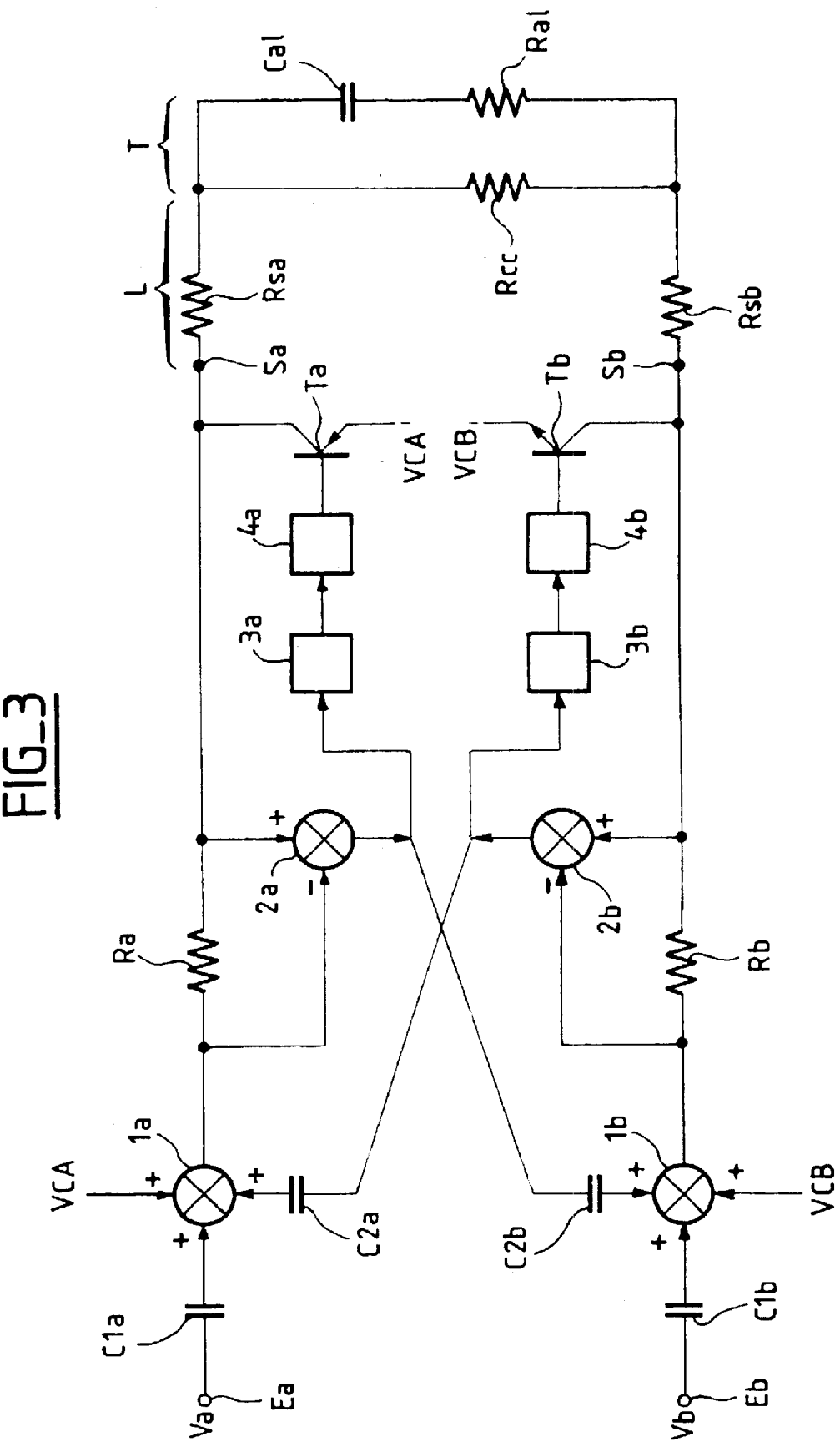
FIG_3

DIFFERENTIAL OUTPUT STAGE FOR ELECTRONIC EQUIPMENT PROVIDING A REMOTE POWER FEED TO A TERMINAL

The invention relates to a differential output stage for electronic equipment, for example a telephone subscriber card or a modem in a telephone exchange.

BACKGROUND OF THE INVENTION

A conventional differential output stage for electronic equipment includes a center-tapped transformer. An AC voltage is applied to the primary winding of the transformer. A DC power supply voltage is applied to the center-tap of the secondary winding. The main terminals of the secondary winding are connected by a line to the terminal which requires a remote power feed. A transformer has the drawbacks of being heavy, bulky and costly and of having a very limited bandwidth. These drawbacks are a particular problem for remote power feeding an HDSL (High bit rate Digital Subscriber Line) modem because a modem of this kind requires 6 W of power, i.e. a power supply current of 60 mA at a voltage of 100 V. This leads to increasing the size of the transformer to prevent it becoming saturated.

European Patent Application EP 0 449 200 (ALCATEL) describes a transformerless differential output stage. It has two inputs, two outputs and two channels each connecting one input to one output. Each channel includes a first differential amplifier for adding to the input voltage of the channel concerned a feedback voltage from the other channel to the channel concerned and a second differential amplifier for subtracting the output voltage of the channel concerned from the output voltage of the first differential amplifier. The output voltage of the second differential amplifier constitutes the feedback voltage from the channel concerned to the other channel.

The above differential stage is perfectly suitable if there is no need for remote power feeding of a terminal by means of a DC current superimposed on the variable current constituting the signal to be transmitted. On the other hand, it is not suitable for remote power feeding a terminal such as a conventional telephone.

OBJECT AND SUMMARY OF THE INVENTION

The object of the invention is to propose a transformerless differential stage which is capable of remote power feeding a terminal.

The invention provides a differential output stage electronic equipment, said output stage including two channels and each channel connecting an input to an output and including first means for adding to the input voltage of the channel concerned a feedback voltage from the other channel to the channel concerned and second means supplying said feedback voltage from the channel concerned to the other channel, wherein the second means for supplying the feedback voltage from the other channel to the channel concerned include means for supplying a feedback voltage which is a function only of the AC component of the output voltage of the first means of the channel concerned and wherein said output stage further includes respective means in each channel for adding a DC voltage to the output voltage of that channel.

The above stage provides a remote power feed to a terminal by means of a DC voltage, in addition to supplying it with an AC signal. Because the feedback voltage is made independent of the DC remote power feed voltage, the feedback voltage cannot oppose the provision of the remote power feed voltage.

BRIEF DESCRIPTION OF THE DRAWINGS

The invention will be better understood and other features will become apparent on reading the following description and from the accompanying drawings:

FIG. 1 is a block diagram of a first embodiment of a differential stage of the invention.

FIG. 2 is a block diagram of a second embodiment of a differential stage of the invention.

FIG. 3 is a block diagram of a third embodiment of a differential stage of the invention.

MORE DETAILED DESCRIPTION

The first embodiment shown in FIG. 1 has:

two input terminals Ea and Eb receiving respective variable voltages Va and Vb constituting a differential signal, and two output terminals Sa and Sb supplying a DC power supply voltage and a differential AC signal to a line L connected to a remote terminal T.

The line L includes two conductors each having a particular resistance. There is a matching and protection resistor in series between the respective output terminal Sa, Sb and each of the aforementioned conductors. The output terminals Sa and Sb see the line L and these matching and protection resistors as respective resistors Rsa and Rsb. The remote terminal T is represented by its DC resistance Rcc and by its capacitance Cal in series with an AC resistance Ral. The terminal is an integrated services digital network terminal, for example. The system of the invention can be similarly connected to a conventional analog telephone, a remote power feed modem, etc.

Terminals Ea and Sa are connected by a first channel which includes:

an adder 1a with three inputs respectively receiving:
    a DC voltage VCA for remote power feeding the remote terminal T.
    the AC component of the input voltage Va via a capacitor C1a, and
    a feedback voltage via a capacitor C2a,
a series-connected resistor Ra between the output of the adder 1a and the output terminal Sa, and
a subtracter 2a having a non-inverting input connected to the output terminal Sa, an inverting input connected to the output of the adder 1a and an output connected to the capacitor C2b to supply it with the feedback voltage.

Terminals Eb and Sb are connected by a second channel which is symmetrical to the first channel and includes:

an adder 1b with three inputs respectively receiving:
    a DC voltage VCB for remote power feeding the remote terminal T,
    the AC component of the input voltage Vb via a capacitor C1b, and
    a feedback voltage via a capacitor C2b,
a series-connected resistor Rb between the output of the adder 1b and the output terminal Sb, and
a subtracter 2b having a non-inverting input connected to the output terminal Sb, an inverting input connected to the output of the adder 1b and an output connected to the capacitor C2a to supply it with the feedback voltage.

The above differential stage supplies a floating differential DC voltage equal to VCA-VCB. It supplies a floating differential AC voltage equal to Va−Vb.

The adders 1a, 1b and the subtracters 2a, 2b are conventionally implemented by means of operational amplifiers. They have zero output resistance. The adder 1a and the subtracter 2a are powered via a first power supply pair providing voltages of 100 V and 90 V relative to a reference potential. The adder 1b and the subtracter 2b are powered via a second power supply pair providing voltages of 0 V and −10 V relative to a reference potential. It is therefore possible to provide a floating remote power feed voltage of 100 V.

If the line and the terminal T are connected to the output terminals Sa, Sb, the DC voltage at the terminals of the terminal T is a function of its DC resistance Rcc, the resistance Rsa+Rsb of the line L and the matching and protection resistors, and the resistance of the feedback resistors Ra and Rb. The AC voltage is a function of the AC resistance Ral, the resistance Rsa+Rsb of the line L and the resistance of the matching and protection resistors. On the other hand, it can be shown that the effect of feedback is to make the AC voltage independent of the resistance of the feedback resistors Ra and Rb.

In this first embodiment, the power supply current is supplied entirely by the adders 1a and 1b. They must therefore be constructed to withstand the power dissipation corresponding to the remote power feed function.

FIG. 2 shows a second embodiment which includes additional means for reducing the dissipation which the adders 1a, 1b must withstand. Those additional means are:

a transistor Ta whose collector is connected to the output terminal Sa, whose emitter is connected directly to the DC power supply voltage VCA and whose base is connected via a resistor Rpa to a DC power supply voltage VBA which is lower than VCA, and a transistor Tb whose collector is connected to the output terminal Sb, whose emitter is connected directly to the DC power supply voltage VCB and whose base is connected via a resistor Rpb to a DC power supply voltage VBB which is lower than VCB.

Transistors Ta and Tb act as direct current generators respectively supplying an additional direct current to output terminal Sa and an additional direct current to output terminal Sb. The direct currents to be supplied by the adders 1a and 1b are therefore reduced and the dissipation in these adders is therefore reduced.

FIG. 3 shows a third embodiment which includes additional means compared to the second embodiment for canceling out the dissipation which the adders 1a and 1b have to withstand to provide the remote power feed. The additional means are:

a low-pass filter 3a in series with an amplifier stage 4a which connect the base of the transistor Ta to the output of subtracter 2a (the resistor Rpa is omitted and the low-pass filter 3a and the amplifier stage 4a are powered by the same means as the adder 1a and the subtracter 2a), and a low-pass filter 3b in series with an amplifier stage 4b which connect the base of the transistor Tb to the output of subtracter 2b (the resistor Rpb is omitted and the low-pass filter 3b and the amplifier stage 4b are powered by the same means as the adder 1a and the subtracter 2b).

Low-pass filters 3a, 3b, filter the feedback voltage supplied by the respective subtracters 2a, 2b and retain only the DC component. That DC component controls the collector current of transistor Ta, Tb so as virtually to cancel out the voltage drop across the respective resistors Ra, Rb. In other words, the DC power supply current of terminal T is supplied exclusively by the transistors Ta and Tb. Thus the dissipation in adders 1a and 1b is minimized. It can be shown that the power supply voltage of the terminal between output terminals Sa and Sb is constant regardless of the value Rsa+Rsb of the resistance of the line L and the matching and protection resistors.

In other embodiments the direct current losses can be minimized by dividing the matching and protection resistor Rsa into two series-connected resistors, one on each side of the point to which the collector of the transistor Ta is connected. Likewise for the resistor Rsb of the other channel.

What is claimed is:

1. A differential output stage for electronic equipment, said output stage including two channels and each channel connecting an input to an output and including first means for adding to the input voltage of the channel to the channel concerned and second means supplying said feedback voltage from the channel concerned to the other channel, wherein the second means for supplying the feedback voltage from the other channel to the channel concerned include means for supplying an feedback voltage which is a function only of the AC component of the output voltage of the first means of the channel concerned and wherein said output stage further includes respective means in each channel for adding a DC voltage to the output voltage of that channel.

2. A differential stage according to claim 1, further including respective means in each channel for adding an additional direct current to the current supplied by the first means of that channel at the output of that channel.

3. A differential stage according to claim 2, further including respective means for each channel for slaving the additional current to the DC component of the current supplied by the first means of that channel at the output of that channel to cancel the DC component of the current supplied by the first means.

* * * * *